United States Patent [19]

Kitchener

[11] 4,455,391

[45] Jun. 19, 1984

[54] PASSIVATED CRG CATALYSTS

[75] Inventor: Ivor J. Kitchener, London, England

[73] Assignee: British Gas Corporation, Great Britain

[21] Appl. No.: 473,554

[22] Filed: Mar. 9, 1983

[30] Foreign Application Priority Data

Mar. 12, 1982 [GB] United Kingdom ............... 8207244

[51] Int. Cl.$^3$ ............................................. B01J 23/84
[52] U.S. Cl. .................................... 502/315; 502/335
[58] Field of Search ................................ 502/335, 315

[56] References Cited

U.S. PATENT DOCUMENTS

| | | | |
|---|---|---|---|
| 2,696,475 | 12/1954 | Farron | 502/335 |
| 3,185,651 | 5/1965 | Bosc | 502/335 |
| 3,363,988 | 1/1968 | Hayes | 502/335 |
| 3,912,775 | 10/1975 | Broecker | 502/335 |
| 4,132,672 | 1/1979 | Wise | 502/335 |
| 4,160,745 | 7/1979 | Murrell et al. | 502/335 |
| 4,216,123 | 8/1980 | Banks et al. | 502/332 |
| 4,285,837 | 8/1981 | Sato et al. | 502/335 |

FOREIGN PATENT DOCUMENTS 1550749 8/1979 United Kingdom ............... 502/335

Primary Examiner—Delbert E. Gantz
Assistant Examiner—Cynthia A. Prezlock
Attorney, Agent, or Firm—Lalos, Leeds, Keegan, Lett, Marsh, Bentzen & Kaye

[57] ABSTRACT

Passivated coprecipitated nickel-alumina catalysts are provided which require minimal reactivation treatment for use as primary steam reforming gasification catalysts and no reactivation treatment when used for catalyzing methanation reactions. The catalysts are prepared by conventional coprecipitation techniques but are calcined at temperatures in excess of 480° C. and reduced at temperatures less than 600°. Passivation is effected by conditioning at 175° to 200° C. in carbon dioxide.

5 Claims, 6 Drawing Figures

ATTENUATION X 16
TPR OF A PELLET OF PASSIVATED CATALYST USED IN CLASSIFICATION TEST

PASSIVATED CRG CATALYSTS

This invention relates to catalysts and to methods for their production. More particularly the invention relates to coprecipitated nickel-alumina catalyst systems which are used for the catalytic steam reforming of hydrocarbons and the methanation of synthesis gases. One such steam reforming process is the Catalytic Rich Gas (CRG) Process and was first described in U.K. Patent Specification No. 820,257. The nickel-alumina catalysts used in the CRG process are known as CRG catalysts.

CRG catalysts are prepared by precipitating a mixed carbonate complex from a mixed aqueous solution of nickel and aluminium salts using a water soluble carbonate or bicarbonate as the precipitating agent. The precipitate is filtered and washed a number of times, dried, calcined and pelleted. The calcined product is a catalyst precursor in which the nickel and aluminium are present as oxides and, in order to obtain the active catalyst, the precursor has to be reduced to produce free nickel metal.

Since the reduced material is highly pyrophoric in the presence of oxygen containing gases, such as air, reduction of the catalyst is carried out in-situ, in the reformer where the steam reforming reactions take place. Reduction is carried out with hydrogen and thus the site at which the reforming operations take place has to have hydrogen supplies available at least for the occasional reduction of fresh catalyst supplies. The hydrogen may be provided either by buying sufficient quantities of bottled gas or by providing a hydrogen manufacturing facility. Thus the provision of the occasionally used reduction facilities adds a burden to the cost of the catalyst.

In addition to the quantities of hydrogen required, high temperatures, of the order of 500° C. are required for long periods of time to ensure adequate reduction. Thus expensive heating equipment has to be provided to reduce the catalyst precursors.

The invention seeks to provide catalysts which can be activated quickly and economically whereby the equipment for reducing gasification catalysts can be minimised and in the case of methanation catalysts can be dispensed with entirely, there being sufficient hydrogen in the reactants to effectively activate the catalysts. Such catalysts can be readily and safely handled and transported.

According to the present invention there is provided a process for the preparation of catalysts wherein a precursor is formed by coprecipitating the catalyst components from an aqueous solution comprising salts of nickel and of aluminium, followed by filtering, washing and drying and calcining, thereafter reducing the precursor to form active catalyst, characterised in that said calcination is carried out at a temperature of from 480° to 550° C., said reduction is carried out at a temperature of at least 450° C. until at least two thirds of the reducible material present in the precursor is reduced, and wherein the reduced catalyst is conditioned in an atmosphere of carbon dioxide for a period of at least one half hour at a temperature of from 175° to 200° C. and thereafter allowing the conditioned catalyst to cool to ambient temperature in said atmosphere.

Although the process of the invention is applicable to all coprecipitated nickel-alumina systems, it is preferred that the catalyst should also contain small amounts of chromium and in this respect catalysts as described in U.K. Patent Specification No. 1,550,749 may be prepared by the process of the invention. The process of the invention may also be used to prepare catalysts such as those described in U.S. Pat. No. 4,216,123.

The present invention will be described in greater detail with reference to the accompanying drawings in which.

Temperature Programmed Reduction and Methanation (TPR and TPM) are analytical techniques used for investigating catalytic reactions occurring under conditions of constant gas flow and continually rising temperature. The technique, for example in reduction, is to raise the temperature to another at a predetermined rate and to determine the rate at which the reducing agent, eg hydrogen, is consumed. Reduction of catalysts on a commercial scale is not carried out on temperature programmed basis, but is usually effected by preheating the precursor to the required temperature and passing reducing agent over the catalyst until the desired degree of reduction is achieved. Of course it is possible to raise the temperature during reduction according to the usual commercial practices. The use of TPR and TPM as described herein is for the purpose of illustrating diagnostic techniques and not for defining conditions for reducing catalysts or catalyst precursors prepared in accordance with the invention.

Figure 4:
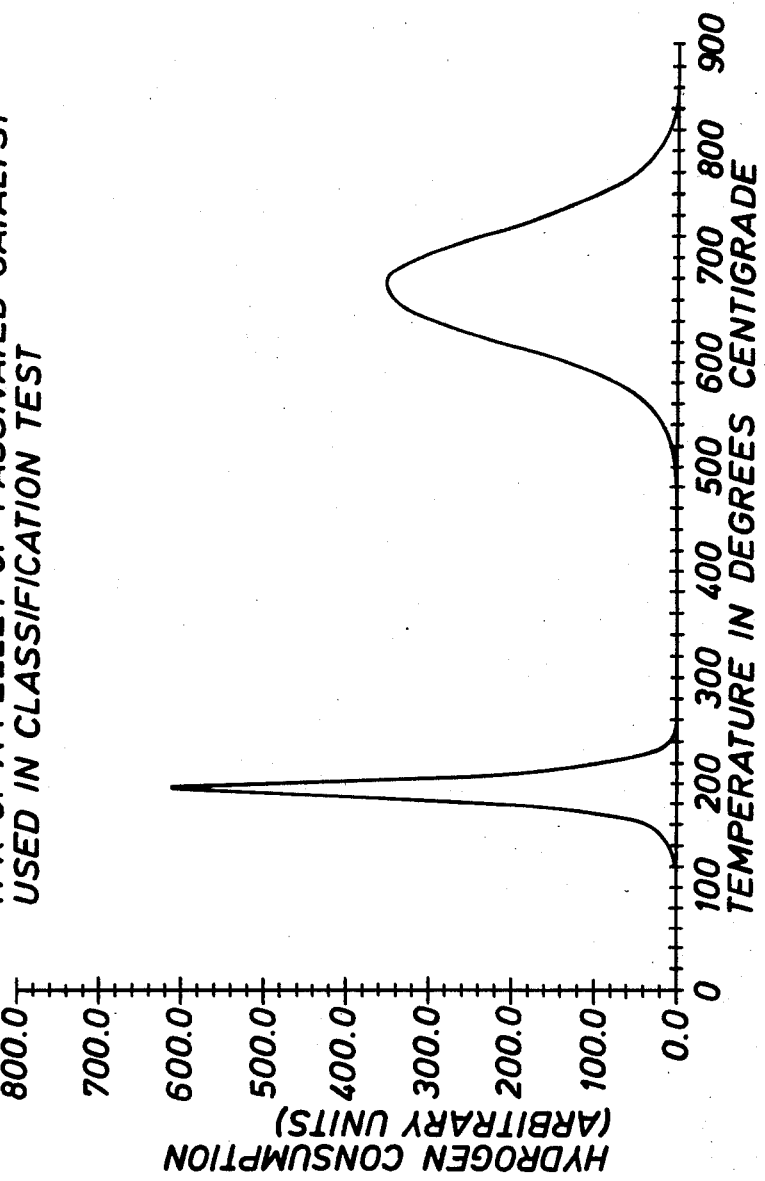

The heating rate for the TPB profiles given in the drawings is 30° C./min except for FIG. 4 which is 10° C./min.

The catalyst precursors are normally prepared by known coprecipitation techniques and post-precipitation treatments, for example as described in U.K. Patent Specification No. 1,550,749 and U.S. Pat. No. 4,216,123 except that the calcination step is carried out at temperatures higher than those used conventionally. Calcination is carried out at a temperature of at least 480° C., preferably from 480° C. to 500° C.

The reduction should be carried out at a temperature of at least 450° C., preferably from 450° C. to 500° C. The use of higher temperatures is not generally recommended. What is essential is the time for which reduction is carried out should be sufficient for at least two-thirds of the reducible components to be reduced.

Figure 1:
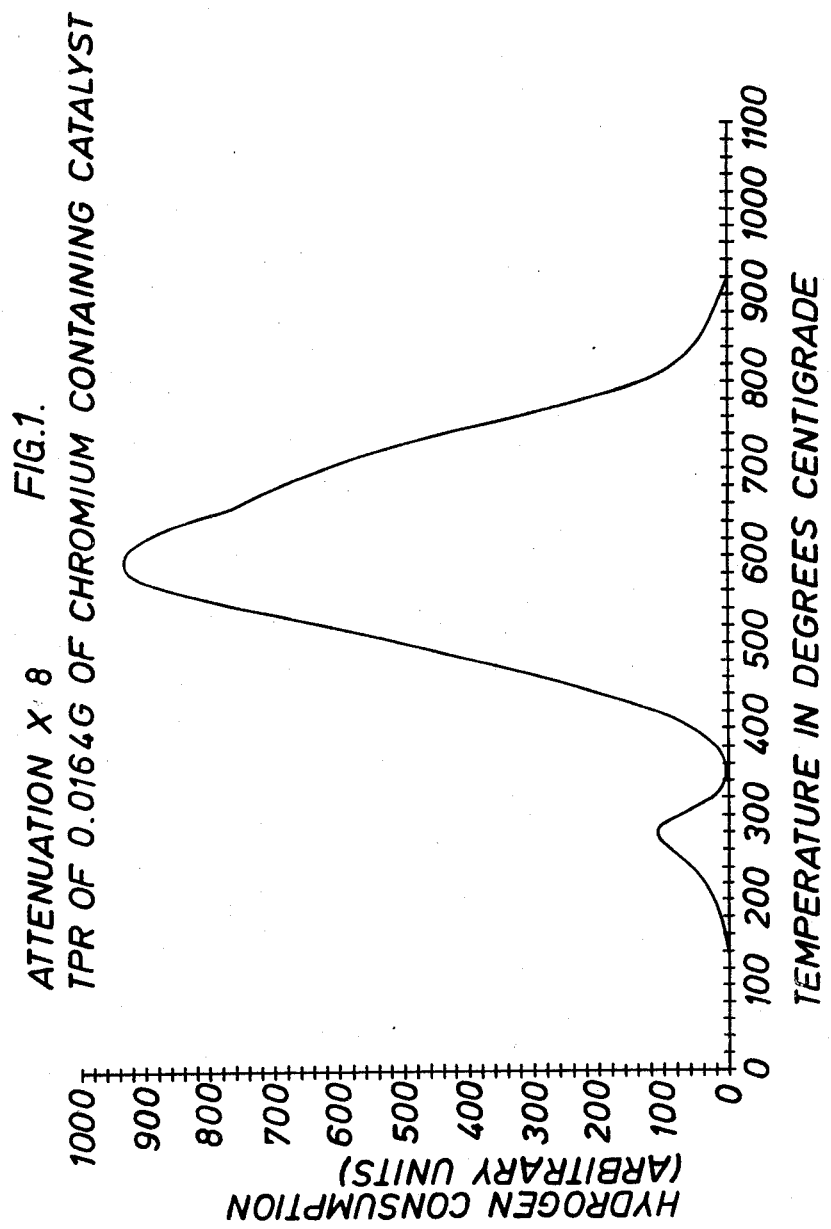
FIGS. 1 to 4 are Temperature Programmed Reduction profiles for catalysts wherein the amount of hydrogen consumed during reduction is plotted against increase in temperature.

FIG. 1 illustrates a TPR profile for a catalyst precursor prepared in accordance with Example 3 of U.K. Patent Specification No. 1,550,749 except that the calcination was effected at 480° C. The first peak (at about 280° C.) indicates the reduction of the chromium component, and the second peak is the nickel reduction. Maximum reduction of the nickel occurs at about 550° C. A similar precursor was reduced under TPR conditions and then held at 500° C. for three hours to effect two-thirds reduction. A 30 mgm sample, passivated by exposure to carbon dioxide for a period of 0.5 hour and at a temperature of 175° C., followed by cooling, exhibited no temperature rise on exposure to oxygen, indicating that substantially no re-oxidation was taking place and hence the catalyst was fully passivated.

Figure 2:
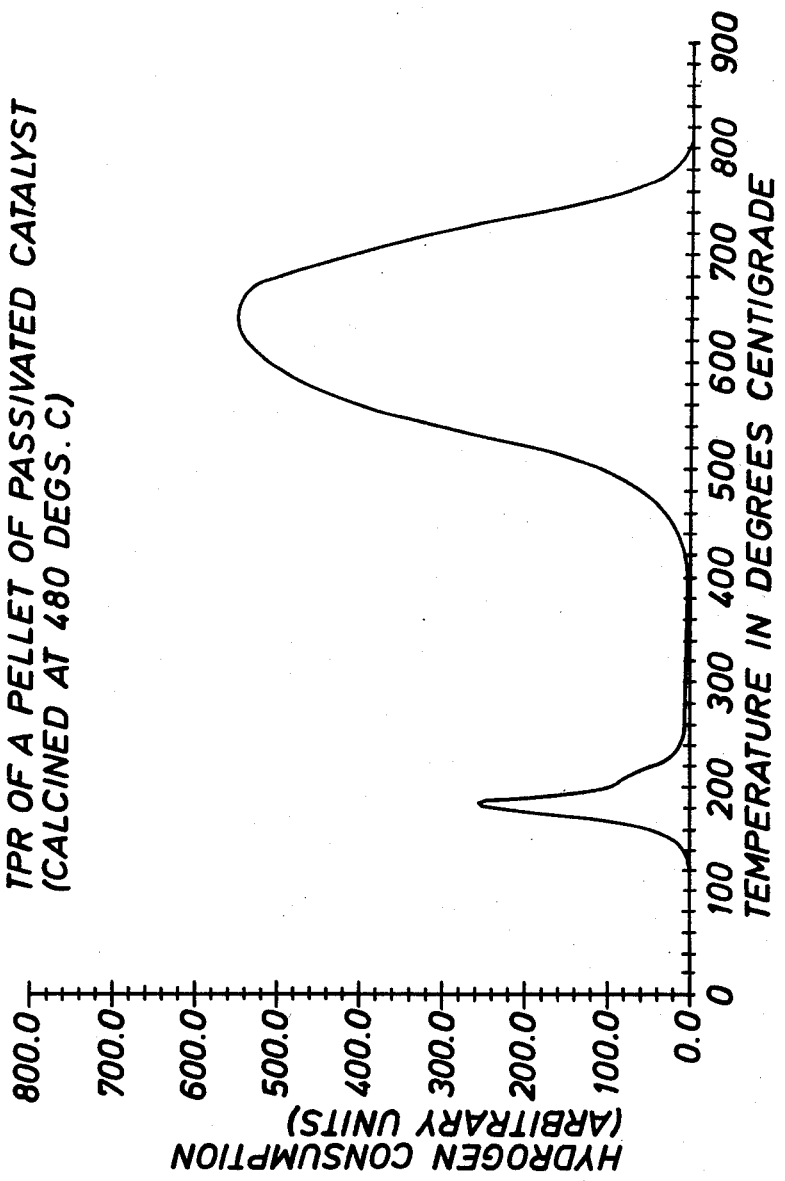

The catalyst sample was then subjected to a further TPR, the reaction profile of which is shown in the TPR profile (FIG. 2). This indicates that a temperature of 250° C. removed the superficial oxide layer formed during the passivation treatment and thus fully reactivated the catalyst. The large, well defined peak at 180° C. in FIG. 2 indicates the amount of surface oxide formed during the $CO_2$ treatment. The second larger peak is in fact primary reduction of precursor material which was not reduced when the precursor was first reduced at 500°.

Figure 3:
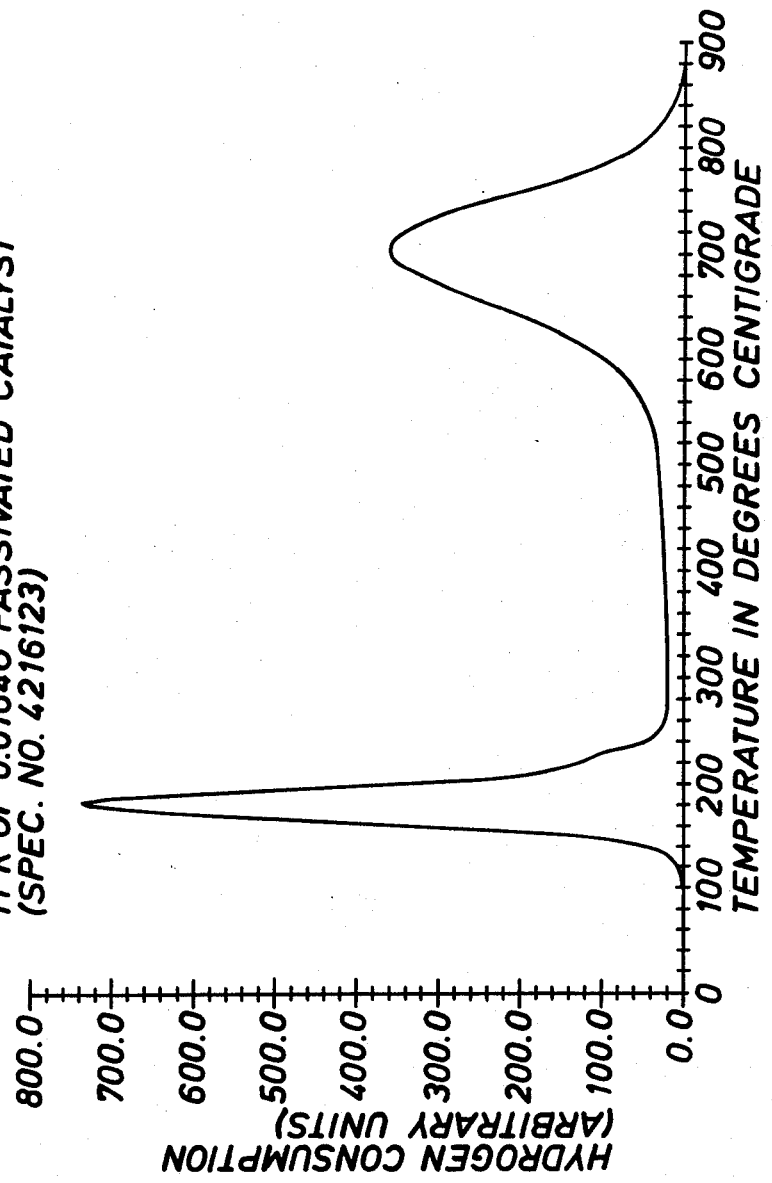

FIG. 3 illustrates a TPR profile for a catalyst sample prepared according to Example 1 of U.S. Pat. No. 4,216,123 calcined at 480° C., and reduced at 550° C. respectively. The catalyst sample was passivated by contacting a 16.4 mgm sample with $CO_2$ at 175° C. for 0.5 hour.

It will be seen from FIG. 3 that a temperature of about 250° C. is required to fully reactivate the catalyst sample, as shown by the first peak. The second peak indicates primary reduction of the final third of the reducible components not reduced in the first (550° C.) reduction stage.

The actual temperature and duration of the $CO_2$ passivation treatment is a function of the amount of catalyst being treated. However, the treatment temperature should not be less than 175° C. and not greater than 200° C. For small samples about 0.5 hour would be sufficient whereas for commercial scale production several hours, for example from 1 to 6 hours would be required. The catalyst is considered to be fully passivated when after cooling to ambient temperature under $CO_2$, no significant temperature rise occurs in the catalyst mass when it is exposed to oxygen.

Catalysts prepared in accordance with the present invention have the same activity as freshly prepared catalysts, both in respect of methanation activity and as primary gasification catalysts.

The invention will be illustrated by the following Example.

Two separate solutions were prepared containing:

| Solution 1 | |
|---|---|
| Nickel Nitrate, Hydrate | 95.4 Kg |
| Aluminium Nitrate Hydrate | 42.6 Kg |
| All in 240 liters of water | |
| Chromium (III) Nitrate, Hydrate | 5.06 Kg |
| Solution 2 | |
| Sodium Carbonate, anhydrous | 73.2 Kg in 192 liters of water |

Both solutions were heated to 60° C. and the carbonate solution added gradually to the nitrate solution whilst maintaining the temperature of the mixture at 60° C.

The precipitate which formed in the mixed solution was separated by filtration, washed by reslurrying with water at 60° C. and filtering. The final filter cake was then dried for 24 hours at 125° C. and thereafter calcined at 480° C. to yield the catalyst precursor.

The precursor was crushed, mixed with 2% graphite and pelleted to 2.5 mm×2.5 mm equant cylinders.

The chemical and physical properties of the pelleted precursor were:

| Chemical | | Physical | |
|---|---|---|---|
| Ni | 60.5% | Q | 31* |
| $Al_2O_3$ | 17.3% | | |
| Cr (III) | 1.9% | PSD | 90%** |
| Na | 0.01% | | |
| C | 2.0% | Total Pore Volume | 0.307 $cm^3g^{-1}$ |
| S | 0.01% | | |

*Q = $\dfrac{\text{Pore Volume (of pores 10-50 Angstroms radius)}}{\text{Pore Volume (of pores 50-300 Angstroms radius)}}$

**PSD% = $\dfrac{\text{Pore Volume (12-30 Angstroms radius)}}{\text{Pore Volume (12-120 Angstroms radius)}} \times 100$ One portion of the pelleted precursor was then reduced in hydrogen at 480° until 70% reduced, after which the catalyst was cooled to 200° C. in hydrogen and, thereafter, carbon dioxide at 200° C. was passed over the catalyst for 4 hours. On cooling and exposure to air no temperature rise was observed.

One pellet of the passivated catalyst was then subjected to TPR. The results are shown in FIG. 4 wherein it will be seen that reactivation occurs at about 250° C.

The remainder of the passivated catalyst was reactivated in hydrogen at 250° C. for 5 minutes to give an active catalyst (A).

A further portion of the catalyst precursor was freshly reduced in situ by the passage of hydrogen at 500° C. of 3 hours. This 'fresh' catalyst is designated as catalyst (B).

Portions of the reactivated catalyst were then subjected to temperature programmed methanation and gasification and compared with portions of the reduced catalyst (B) which had not undergone passivation treatment.

Gasification

Figure 5:
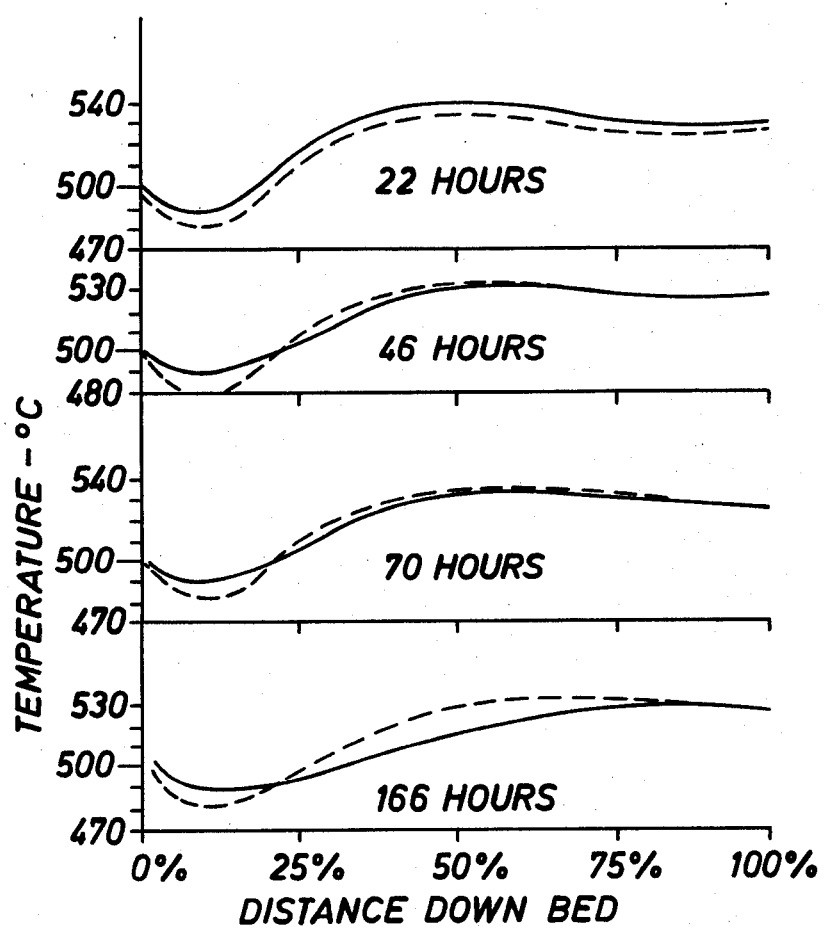
FIG. 5 is a reaction temperature profile for a gasification reaction utilising a catalyst prepared in accordance with the invention.

A gas oil (boiling range 184°-341° C.) was vaporised and mixed with steam (in a weight ratio of 2 parts steam to 1 part gas oil) to give a reactant mixture which was then preheated to 500° C. and stream were separately passed over two catalyst beds; one containing 'reactivated' catalyst (A), the other containing 'fresh' catalyst (B). Each catalyst bed was provided with thermocouples down the length of the bed and the temperature at each point measured after 22, 46, 70 and 166 hours. FIG. 5 illustrates the reaction temperature profiles, from which it can be seen that the gasification performance of the reactivated catalyst is substantially the same as freshly reduced catalyst. The profile for the fresh catalyst (B) is shown by the solid line and that for the reactivated catalyst (A) by the dashed line.

Methanation

The initial activity of the catalyst can be determined by the temperature at which it will start to methanate.

Figure 6:
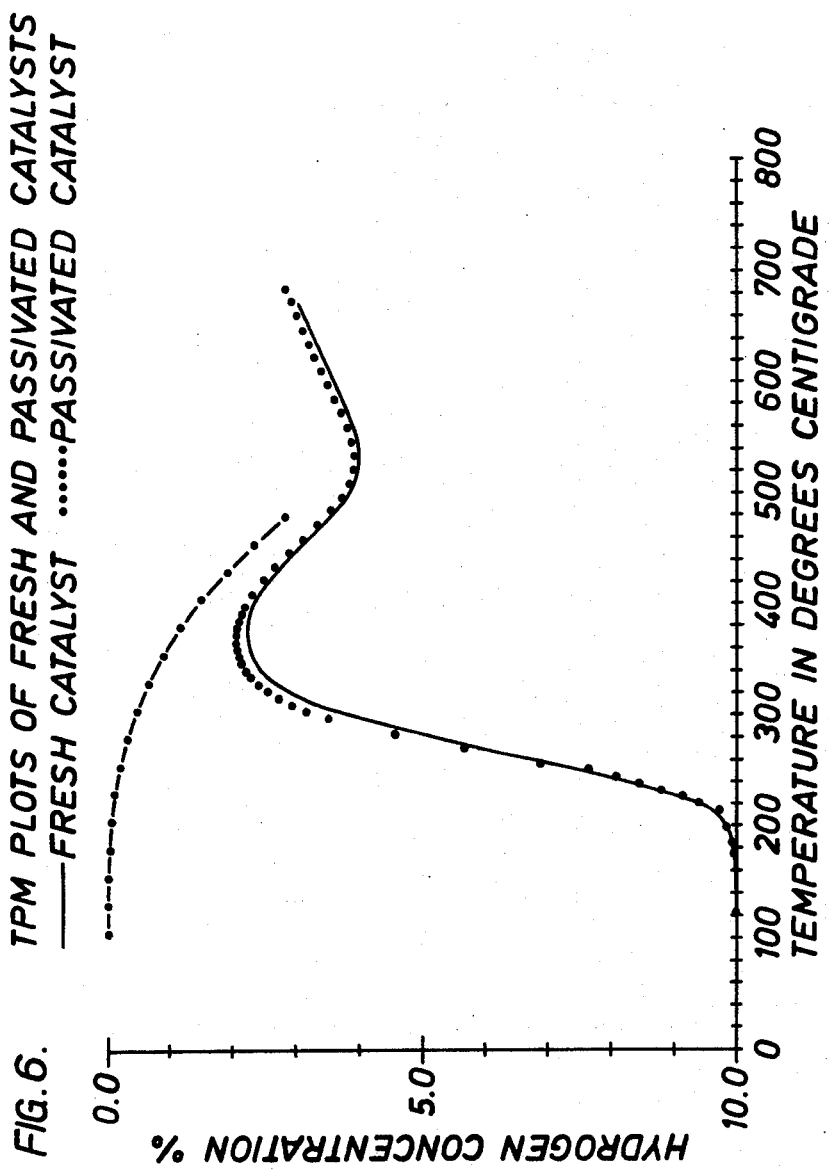
FIG. 6 is a Temperature Programmed Methanation profile for a catalyst prepared in accordance with the invention.

Catalysts (A) and (B) were loaded into separate reactors and into each reactor was passed a reactant mixture comprising 10% $H_2$ in $CO_2$. The temperature of the catalyst bed was raised at the rate of 30° C./minute. The TPM profile is shown in FIG. 6. The profile for fresh catalyst (B) is shown by the solid line and that for the reactivated catalyst (A) by the dotted line.

Gas analysis shows that methane production occurs simultaneously with the first sign of hydrogen removal. The methane content rises with the profile, reaching a maximum at the top of the peak for hydrogen consumption. After this point the formation of carbon monoxide begins and methane formation continuously falls from about 380° C. After 480° C. reverse shift increasingly occurs which accounts for the net rise in hydrogen consumption.

The profile does not reach the theoretical equilibrium values (shown by the dot-dash line); this probably being due to the methane formed upsetting the response of the thermistor detector. It will be observed, however, that the reaction profiles for both the fresh and passivated catalysts are very similar.

It will be noted that where catalysts, produced by the method of the invention, are to be used as methanation catalysts, there is no need to reactivate the passivated catalyst. The temperature at which the onset of methanation occurs and the amount of hydrogen present in the reactant mixture to be methanated are sufficient to provide the necessary conditions to reactivate the catalyst.

I claim:

1. In a process for preparing a catalyst wherein a precursor is formed by coprecipitating the catalyst components from an aqueous solution comprising salts of nickel and of aluminium, followed by filtering, washing, drying and calcining the coprecipitate, and thereafter reducing the coprecipitate precursor to form an active catalyst, the steps of carrying out said calcination at a temperature in the range of from greater than 480° C. to 550° C.;

carrying out said reducing of the precursor at a temperature of at least 450° C. until at least two-thirds of the reducible material present in the precursor is reduced;

conditioning the thusly reduced catalyst in a carbon dioxide atmosphere at a temperature in the range of from 175° C. to 200° C. for a period of at least one-half hour; and thereafter allowing the conditioned catalyst to cool to ambient temperature in said carbon dioxide atmosphere.

2. In a process as set forth in claim 1, said aqueous solution further comprising a chromium salt whereby the prepared catalyst contains chromium.

3. In a process as set forth in claim 1 or claim 7, said reducing of the precursor being carried out at a temperature of about 500° C.

4. In a process as set forth in claim 1 or claim 7, said calcination being carried out at a temperature in the range of from 480° C. to 500° C.

5. In a process as set forth in claim 1 or claim 7, said conditioning being carried out at a temperature of 200° for a period of from 1 to 6 hours.

* * * * *